US008639870B2

(12) United States Patent
Hostetter et al.

(10) Patent No.: US 8,639,870 B2
(45) Date of Patent: Jan. 28, 2014

(54) STRING SEARCHING WITHIN PERIPHERAL STORAGE DEVICES

(75) Inventors: David G. Hostetter, Louisville, CO (US); Gregory S. Toles, Erie, CO (US); Bradley Edwin Whitney, Erie, CO (US)

(73) Assignee: Oracle International Corporation, Redwood City, CA (US)

( * ) Notice: Subject to any disclaimer, the term of this patent is extended or adjusted under 35 U.S.C. 154(b) by 363 days.

(21) Appl. No.: 13/006,587

(22) Filed: Jan. 14, 2011

(65) Prior Publication Data

US 2012/0182639 A1  Jul. 19, 2012

(51) Int. Cl.
*G06F 3/06* (2006.01)

(52) U.S. Cl.
USPC .......... 711/4; 711/111; 711/137; 711/E12.057

(58) Field of Classification Search
USPC ...................... 711/111, 154, 4, 137
See application file for complete search history.

(56) References Cited

U.S. PATENT DOCUMENTS

| 4,757,396 | A | * | 7/1988 | Ishiguro et al. ................. 360/69 |
| 5,034,914 | A | * | 7/1991 | Osterlund ........................ 710/52 |
| 5,375,224 | A | * | 12/1994 | Larsen et al. ................... 710/33 |
| 5,384,673 | A | * | 1/1995 | Yoshioka et al. ............ 360/72.2 |
| 5,448,733 | A | * | 9/1995 | Satoh et al. ............................ 1/1 |
| 5,457,794 | A | * | 10/1995 | Azumatani et al. .................... 1/1 |
| 5,551,020 | A | * | 8/1996 | Flax et al. .............................. 1/1 |
| 5,608,875 | A | * | 3/1997 | Mori ................................. 711/4 |
| 5,675,447 | A | | 10/1997 | Goker et al. |
| 5,781,897 | A | * | 7/1998 | Chen et al. ..................... 707/758 |
| 6,654,853 | B1 | * | 11/2003 | Gates et al. ................... 711/114 |
| 6,862,149 | B2 | | 3/2005 | Maple et al. |
| 7,370,153 | B1 | * | 5/2008 | Danilak ......................... 711/137 |
| 7,764,201 | B2 | * | 7/2010 | Schneider ....................... 341/51 |
| 7,822,731 | B1 | * | 10/2010 | Yu et al. ....................... 707/705 |
| 2001/0052062 | A1 | | 12/2001 | Lipovski |
| 2004/0059725 | A1 | | 3/2004 | Sharangpani et al. |
| 2004/0148303 | A1 | | 7/2004 | McKay et al. |
| 2004/0250027 | A1 | * | 12/2004 | Heflinger ....................... 711/156 |
| 2006/0215291 | A1 | * | 9/2006 | Jaquette et al. ................. 360/39 |
| 2010/0312959 | A1 | * | 12/2010 | Petit et al. ...................... 711/112 |

OTHER PUBLICATIONS

Daniel P. Bovet. Understanding the Linux Third Edition. Nov. 2005. Chapter 14.1. 0596005652.*

* cited by examiner

*Primary Examiner* — Edward Dudek, Jr.
*Assistant Examiner* — Sean D Rossiter
(74) *Attorney, Agent, or Firm* — Brooks Kushman P.C.

(57) ABSTRACT

Systems and methods for retrieving data stored on a peripheral storage device such as a magnetic tape drive or disk drive include string searching using the peripheral storage device resources without transferring data to the requesting host computer and transferring only data blocks with matching data to the associated host computer to conserve host resources and data channel and/or network bandwidth.

18 Claims, 3 Drawing Sheets

STRING SEARCHING WITHIN PERIPHERAL STORAGE DEVICES

TECHNICAL FIELD

The present disclosure relates to systems and methods for searching for one or more designated target data strings stored on a peripheral storage device.

BACKGROUND

Network servers and other host computers may use different types of peripheral storage devices having different capacities, access times, and other operating characteristics suitable for various applications. Enterprise and data center solutions may employ multiple complementary data storage devices to achieve desired data availability, reliability, security, long-term accessibility, and cost effectiveness, among other considerations. Many networks use an automated schedule to archive data for long-term storage. Long-term storage devices may be implemented using a wide variety of storage technologies including magnetic and optical disk drives, solid-state drives, tape drives, or other types of storage devices. However, compromises among performance, capacity, and cost are often required. Tape drives continue to provide cost-effective, reliable, and energy efficient long-term data storage, particularly for high-volume backups, long-life archives, disaster recovery/business continuity, compliance, and various other applications that include inactive data.

Locating and retrieving data from peripheral storage devices often requires transferring large amounts of data from various storage media to the host computer for processing, which utilizes significant host resources and data channel and/or network bandwidth. This may adversely impact performance of any applications or processes waiting for the data, as well as reducing host resources available for servicing other unrelated processes or applications.

One known strategy provides rudimentary search functions for a single data string using local peripheral device resources. Another strategy has utilized an intermediate peripheral device controller in communication with the host computer and multiple peripheral devices. The intermediate controller implements shared control such that only one of the multiple peripheral devices can be searched by the controller at any particular time, with data transferred from the peripheral device to the controller for searching and matching data blocks transferred from the controller to the host computer.

SUMMARY

A system or method for retrieving data stored on a peripheral storage drive having an associated drive processor in communication with a host computer having an associated host processor includes communicating a search request to the drive processor having at least one search string and at least one search option associated with identifying search strings that span a data delineator that separates adjacent data blocks stored on the drive. The method includes reading data blocks separated by an associated data delineator stored on the drive media, comparing the at least one search string of the search request with data of the data blocks using the drive processor without transferring the data blocks to the host processor, transferring each data block that contains data matching the at least one search string to the host processor, and transferring adjacent data blocks to the host processor when the search string matches data that span the associated data delineator separating the adjacent data blocks only when specified by the at least one search option. Adjacent data blocks may be logically adjacent but stored at physically non-adjacent locations of the storage medium.

Embodiments include a system for retrieving data stored on a storage device in communication with a host device, includes a storage device processor in communication with a data storage medium for storing data in data blocks separated by a data delineator, the storage device processor receiving a search request from the host device having at least one search string and at least one search option. A buffer associated with the storage device processor temporarily stores data retrieved from the storage medium. Control logic implemented by software and/or hardware transfers data from at least one data block to the buffer, compares data from the at least one data block with the at least one search string, and sends a message to the host if the comparison indicates a match. The system also includes control logic that transfers only data blocks containing data matching at least one search string from the storage device to the host device. The system may also include control logic that compares at least one search string to data spanning adjacent data blocks as stored on the storage medium when the search request includes at least one search option that designates a search for at least one string spanning data delineators. Adjacent data blocks may be physically adjacent on the storage medium and/or logically adjacent as specified by the host computer and stored in physically non-adjacent locations on the storage medium, such as often occurs in randomly accessible media, such as a disk drive, for example.

In one embodiment, a method for retrieving data stored on a magnetic tape accessed by a tape drive having an associated tape drive processor in communication with a host computer having an associated host processor includes communicating a search request to the tape drive processor, the search request having at least one search string and at least one search option associated with identifying search strings that span a data delineator that separates adjacent data blocks stored on the magnetic tape, reading data blocks separated by an associated data delineator stored on the magnetic tape, comparing at least one search string of the search request with data of the data blocks using the tape drive processor without transferring the data blocks to the host processor, transferring each data block that contains data matching at least one search string to the host processor, and transferring adjacent data blocks to the host processor when the at least one search string matches data that span the associated data delineator separating the adjacent data blocks only when specified by the at least one search option.

Various embodiments according to the present disclosure may include search options or operating parameters to provide more sophisticated searching using the peripheral device resources and transferring only data blocks or records containing matching data to the host computer. For example, search options or modes may be specified by corresponding search parameters communicated to the peripheral device to search all bytes of each record or data block, search beginning at a specified byte offset, search all records or data blocks until the end of the media is reached, search from designated starting data block or record to a designated ending block, record, or other delineator, search to the next tape mark or other data delineator, search for strings spanning a data block, record, or other delineator, search for multiple data strings, and/or search for multiple data strings using one or more Boolean operators, for example.

Embodiments according to the present disclosure provide various advantages. For example, systems and methods for retrieving data stored on a peripheral storage device such as a magnetic tape drive or disk drive that use the peripheral storage device resources and transfer only data blocks with matching data to the associated host computer according to the present disclosure conserve host computer resources including processor and memory capacity as well as data channel and/or network bandwidth. In addition, string searching using the peripheral device resources facilitates parallel simultaneous searches on multiple drives to improve overall search efficiency and performance. For tape drive applications, searching using local tape drive hardware and/or software resources facilitates searching at native drive speed without host computer intervention.

The above advantage and other advantages and features of the present disclosure will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the embodiments as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
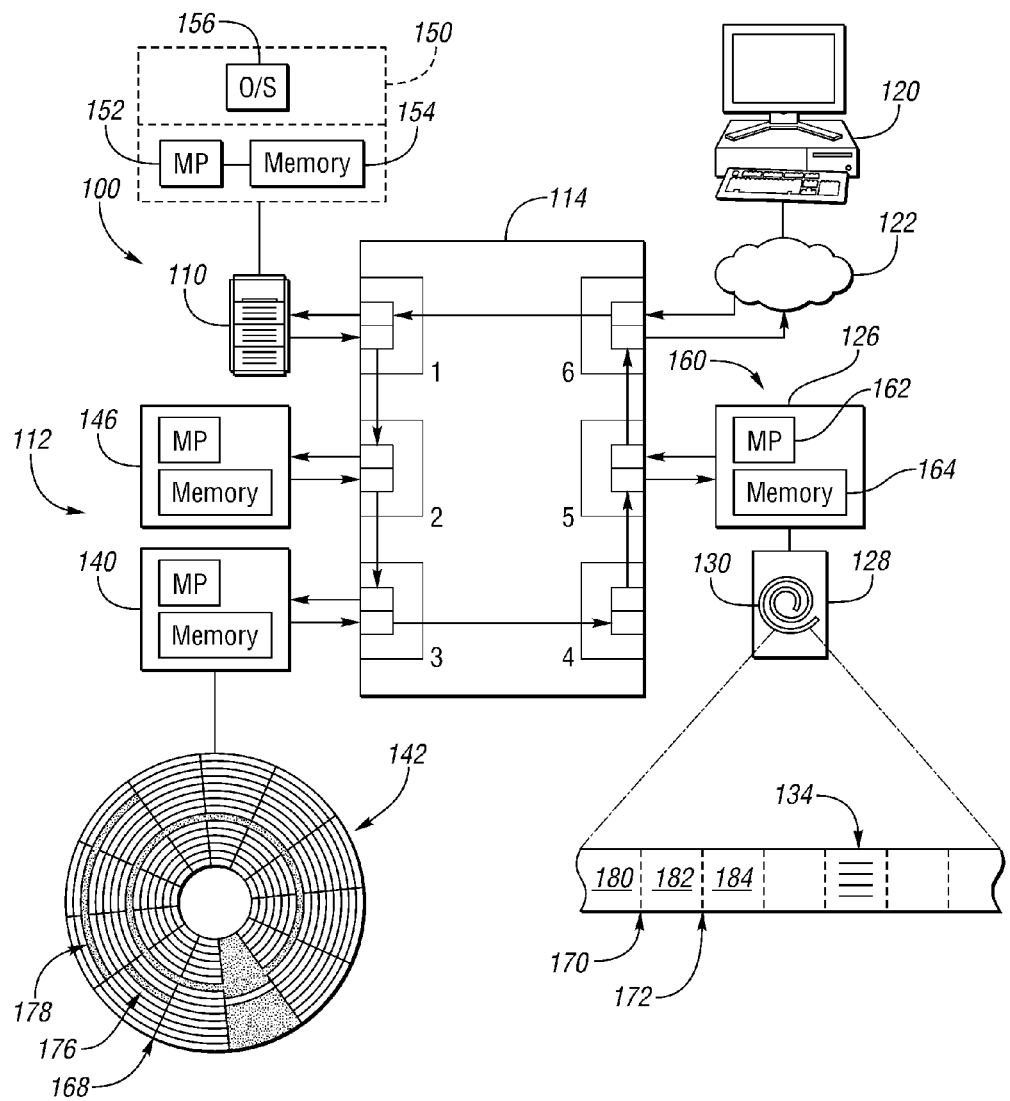
FIG. 1 is a block diagram illustrating operation of a representative system or method for peripheral storage device string searching according to embodiments of the present disclosure.

Referring now to FIG. 1, a block diagram illustrating operation of a representative system or method for peripheral storage device string searching according to embodiments of the present disclosure is shown. In the embodiment illustrated in FIG. 1, system 100 includes a host computer 110 in communication with one or more peripheral storage devices 112. The string searching systems or methods according to the present disclosure are generally independent of the system physical topology and/or type of peripheral storage device. As illustrated in FIG. 1, a fiber channel hub 114 is used to connect host computer 110 with peripheral storage devices 112 in an arbitrated loop configuration with single or dual port connections. As known, dual port technology provides a redundant path and allows connections to two ports, which increases the flexibility of the device, although generally only one port is active for data transfer at any particular time. Peripheral devices 112 may be physically remotely located relative to host computer 110 and/or may be disposed within the same physical location. For example, peripheral storage devices 112 may be located within the same rack, housing, or room as host computer 110. Alternatively, or in combination, one or more host computers 110, as generally represented by host computer 120, may be connected to peripheral devices 112 by a local or wide area private or public network, such as the internet, as generally represented at 122. Host computers 110, 120 may include other local and/or remote storage devices (not specifically illustrated).

Peripheral storage devices 112 may include various types of devices and associated storage media used to persistently store data. Embodiments may include peripheral storage devices 112 implemented by one or more magnetic, optical, solid-state, and/or hybrid drives having permanent or removable storage media to persistently store data. For example, peripheral storage devices 112 may include one or more magnetic tape drives 126 having an associated removable media cartridge 128 containing linear magnetic tape storage media 130. In one embodiment, tape drive 160 is implemented by a StorageTek T10000 series tape drive manufactured by Oracle Corporation of Redwood City, Calif. Of course, other types of tape drives and drive technologies may be used such as an LTO (Linear Tape-Open) tape drive, for example. Peripheral storage devices 112 may also include one or more disk drives 140 having permanent magnetic disks or platters 142 installed therein. Similarly, solid-state drive 146 includes associated storage media (not shown) implemented by flash memory or similar non-volatile or persistent memory devices.

As illustrated and described in greater detail herein, various types of storage media, such as linear tape 130 and disk 142, for example, may include one or more data delineators, generally represented by reference numerals 168, 170, 172 separating adjacent data blocks or records 176, 178, 180, 182, 184 stored on the media. Various types of delineators may be used to separate logical data units specified by the operating system of host computers 110, 120, and/or the storage subsystem associated with the peripheral device. For example, data markers or delineators may be used to separate host logical units such as records, files, directories, data sets, sessions, etc. Adjacent data blocks, records, files, etc. separated by an associated data delineator may be physically adjacent on the storage medium, or may be logically adjacent when sent by the host, but physically separated at the peripheral storage device 112. As used herein, adjacent data generally refers to logically adjacent data, which may or may not be located physically adjacent on the storage medium. For example, logically adjacent data blocks 180, 182 are separated by an associated data delineator 170 on magnetic tape 130 and are also physically adjacent on the storage medium. In contrast, logically adjacent data 176, 178 are stored in physically non-adjacent storage locations on storage medium 142. Magnetic tape 134 generally includes a plurality of data bands each having a plurality of data tracks and separated by servo tracks used to align the read/write heads of the tape drive 126 to a particular tape 130. Depending on the particular technology, data may be written to tape 130 in a serpentine fashion. As such, various types of data delineators may be written to only a single data track, across multiple tracks, or across the entire tape. For example, a tape mark is one type of data delineator that may be written across multiple tracks or the entire tape whereas a data record or audit record may be written within a single track or data band. As those of ordinary skill in the art will recognize, peripheral string searching according to various embodiments of the present disclosure is generally independent of the particular type of storage media, drive, or data delineator. As such, various string searching modes or controls may be used to identify matching strings spanning various types of data delineators.

While host computers 110, 120 may be configured differently depending on the particular configuration, host computers 110, 120 include various host resources 150 that may be implemented by associated hardware and/or software. For example, host resources 150 may include hardware associated with a microprocessor 152 and memory 154, as well as software, such as an operating system (O/S) 156 and associated device drivers and one or more application programs. Host computers 110, 120 may be dedicated or general-purpose computer systems depending upon the particular application and implementation of system 100. For example, host computer 110 generally represents a computer server that may be accessed by an administrator from a remotely located console (not shown), for example, and communicates with client computers over one or more local or wide area networks. Host computer 120 represents a stand-alone general purpose computer that may be function as a client to server 110. Likewise, although peripheral storage devices 112 may be implemented by different types of drives having various types of storage media, each includes associated storage device resources 160 implemented by hardware and/or software that generally include a microprocessor 162 and associated memory 164. As described in greater detail herein, peripheral storage devices 112 include control logic implemented by software, firmware, microcode and/or hardware devices such as integrated circuits and/or electronics to perform string searching according to the present disclosure.

In operation, system 100 implements a method for retrieving data stored on a peripheral storage device 112, which may be implemented by a magnetic tape 130 accessed by a tape drive 126 having an associated tape drive processor 162. Tape drive processor 162 is in communication with a host computer 110, 120 via hub 114 and/or network 122. Host computer 110 includes an associated host processor 152. System 100 may communicate a search request having at least one search string and at least one search option from a host computer processor 152 to a peripheral device processor 162. As explained in greater detail below, at least one search option may include a parameter or option to search for the target data string(s) without regard to data delineators on the search media that separate logically and/or physically adjacent data blocks so that string(s) spanning an associated data delineator can be located if this option is specified in the search request. Upon receiving the search request, device processor 162 reads data blocks separated by an associated data delineator stored on storage media 130 into local device memory 164. Tape drive 126 (or other peripheral storage device) uses local device resources 160 (which may include tape drive processor 162 and/or dedicated logic devices, circuits, and other hardware, for example) to compare the at least one search string of the search request with data of the data blocks in local device memory 164 without transferring the data blocks to host computer 110, 120. Peripheral device processor 162 then transfers each data block that contains data matching at least one search string to the host processor 152 of host computer 110. Device processor 162 may also transfer adjacent data blocks to host processor 152 when at least one search string matches data that span the associated data delineator separating the adjacent data blocks only when specified by at least one search option.

Depending on the particular application and implementation, various other search parameters or options may be specified to designate an available search mode and/or control the search. For example, search options or modes may be specified by corresponding search parameters communicated to peripheral storage devices 112 to search all bytes of each record or data block, begin searching at a specified byte offset within the data block or record, search all records or data blocks until the end of the media is reached, search from a designated starting data block or record to a designated ending block, record, or other delineator, search to the next tape mark or other data delineator, search for strings spanning a data block, record, or other delineator, search for multiple data strings, and/or search for multiple data strings using one or more Boolean operators, for example. Operation of representative search options or modes is illustrated and described in greater detail with reference to FIGS. 2 and 3.

As demonstrated by the embodiment illustrated in FIG. 1, peripheral string searching according to the present disclosure performs the string search within peripheral storage device 112 using local device resources 160 to conserve host resources 150 and associated data channel and/or network bandwidth in contrast to previous search strategies that required transferring data blocks from peripheral storage devices 112 to host computer 110, 120 before the data could be searched for the desired search string. As also demonstrated by the representative embodiment of FIG. 1, a system 100 according to the present disclosure can communicate a search request having at least one search string and associated search parameters to multiple peripheral storage devices 112 substantially simultaneously. Because each peripheral storage device 112 includes local device resources capable of executing the search, multiple storage media can be searched substantially simultaneously with only matching data blocks or records transferred to the requesting host computer 110 or 120, for example. As such, host resources 150 are available to service other processes or applications while peripheral storage devices are performing the requested search.

Figure 2:
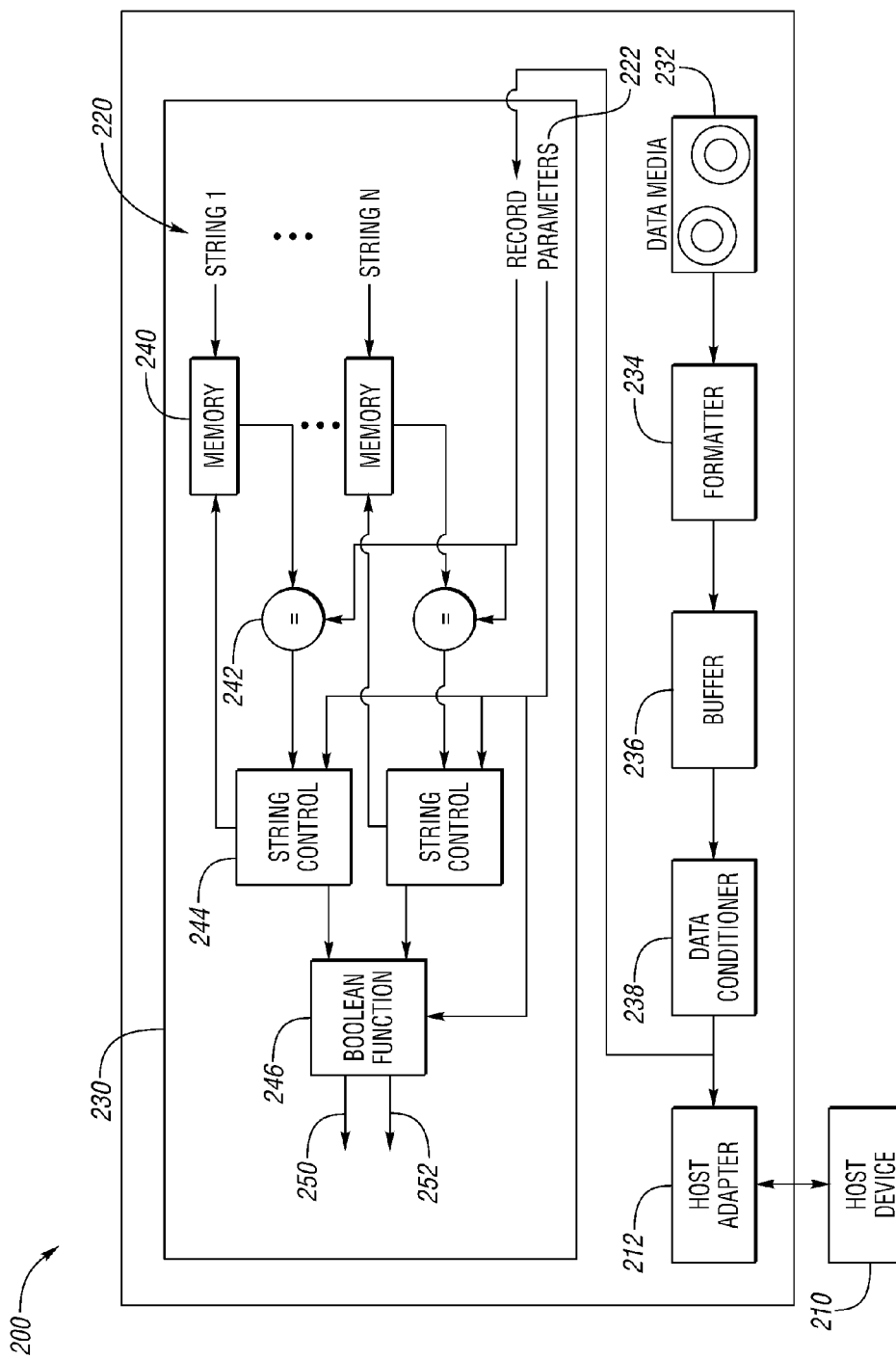
FIG. 2 is a block diagram illustrating string searching using peripheral storage device resources in a representative tape drive implementation of one embodiment according to the present disclosure.

FIG. 2 is a block diagram illustrating string searching using peripheral storage device resources in a representative tape drive implementation of one embodiment according to the present disclosure. Tape drive 200 communicates with a host computer or device 210 as previously described via host adapter 212 to receive a search request having at least one search string 220 and at least one search option or parameter 222 to designate or control the string searching mode of operation. Tape drive 200 includes a processor and/or control logic 230 implemented by hardware and/or software that cooperate to perform string searching using local device resources according to the present disclosure. Tape drive 200 may include one or more processors and associated circuitry to perform various functions associated with reading/writing data to magnetic tape 232. For example, one or more processors and associated circuitry may cooperate with processor or control logic 230 to provide error correction, encryption, read/write head servo control, etc. as known by those of ordinary skill in the art. In the embodiment illustrated in FIG. 2, tape drive 200 includes a data formatter module 234, data buffer 236, and data conditioner 238. Processor or control logic 230 includes dedicated or shared memory 240, comparators 242, string control modules 244, and at least one Boolean function module 246. Depending on the particular application and implementation, various modules or functions may be implemented in software executed by an associated tape drive microprocessor.

Search requests received from host device 210 via host adapter 212 are parsed with each of the at least one search strings stored in corresponding memory locations 240 and corresponding search options or parameters provided to comparators 242, string control modules 244, and Boolean function module 246. The tape drive processor begins reading the magnetic tape media 232 and transferring data to data formatter 234, which de-formats the data and performs any error detection/correction or decryption functions and temporarily stores the de-formatted data in buffer 236 with an associated data block or record ID. The buffered data is then processed by data conditioner 238 where it is transformed back to its original host data. The conditioned data is then provided to the peripheral string search control logic 230 for evaluation. If data within the data block or record satisfies or matches the search string(s) and associated criteria of the search request, the data block or record is sent to host device 210 via host adapter 212.

As previously described, if multiple string searches are enabled, each search string 220 specified by a search request is stored in a corresponding memory location 240. The search strings are then byte-wise compared to data in the current record or data block via a corresponding comparator 242. The result of each comparator 242 is provided to an associated string control block or module 244. String control block 244 uses the search parameters 222 included in the search request to select the byte in memory 240 to be compared with the incoming data and determines if the output of the comparator 242 should be considered as part of a match. Each string control module 244 provides an indication to Boolean function block 246 when the corresponding string has matched data within a particular data block or record. Boolean function block 246 then applies or evaluates the Boolean operator or expression specified by search parameters 222 relative to the results from string control modules 244 to determine whether the Boolean operation or expression is satisfied. If the Boolean operation or expression is satisfied, an interrupt 250 and status 252 is sent to the peripheral device control processor. The peripheral device control processor may then coordinate transfer of the matching block or adjacent blocks to host device 210. All records or other data blocks that do not satisfy the search criteria are discarded from buffer 236. As such, control logic 230 transfers only data blocks containing data matching the at least one search string from the tape drive 200 to host device 210.

If the search request includes search parameters 222 that designate a search for at least one string spanning data delineators, control logic 230 compares the at least one search string 220 to data stored on data media 232 spanning logically and/or physically adjacent data blocks as stored on storage media 232. For example, control logic 230 may compare the at least one search string 220 stored in associated memory 240 to data from a first data block or record 182 (FIG. 1) to determine a partial match. If a partial match is determined, control logic 230 compares an unmatched portion of the at least one search string 220 with data from an adjacent data block 184 separated by data delineator 172 to determine whether the at least one search string 220 matches data spanning the adjacent data blocks 182, 184. Various strategies may be utilized to determine partial matches. For example, string control blocks or modules 244 may be cleared or reset when a data delineator is encountered if the spanning search parameter has not been specified in the search parameters of a particular search request. As such, data spanning a delineator would not be considered to match the at least one search string 220. Of course, other techniques for matching string(s) 220 to data spanning a data delineator may also be used, and may vary depending on the type of data delineator or host logical unit as well as the particular application, for example. If control logic 230 identifies at least one search string spanning adjacent data blocks or records, tape drive may optionally transfer both data blocks, or one of the data blocks as determined by the search parameters.

Figure 3:
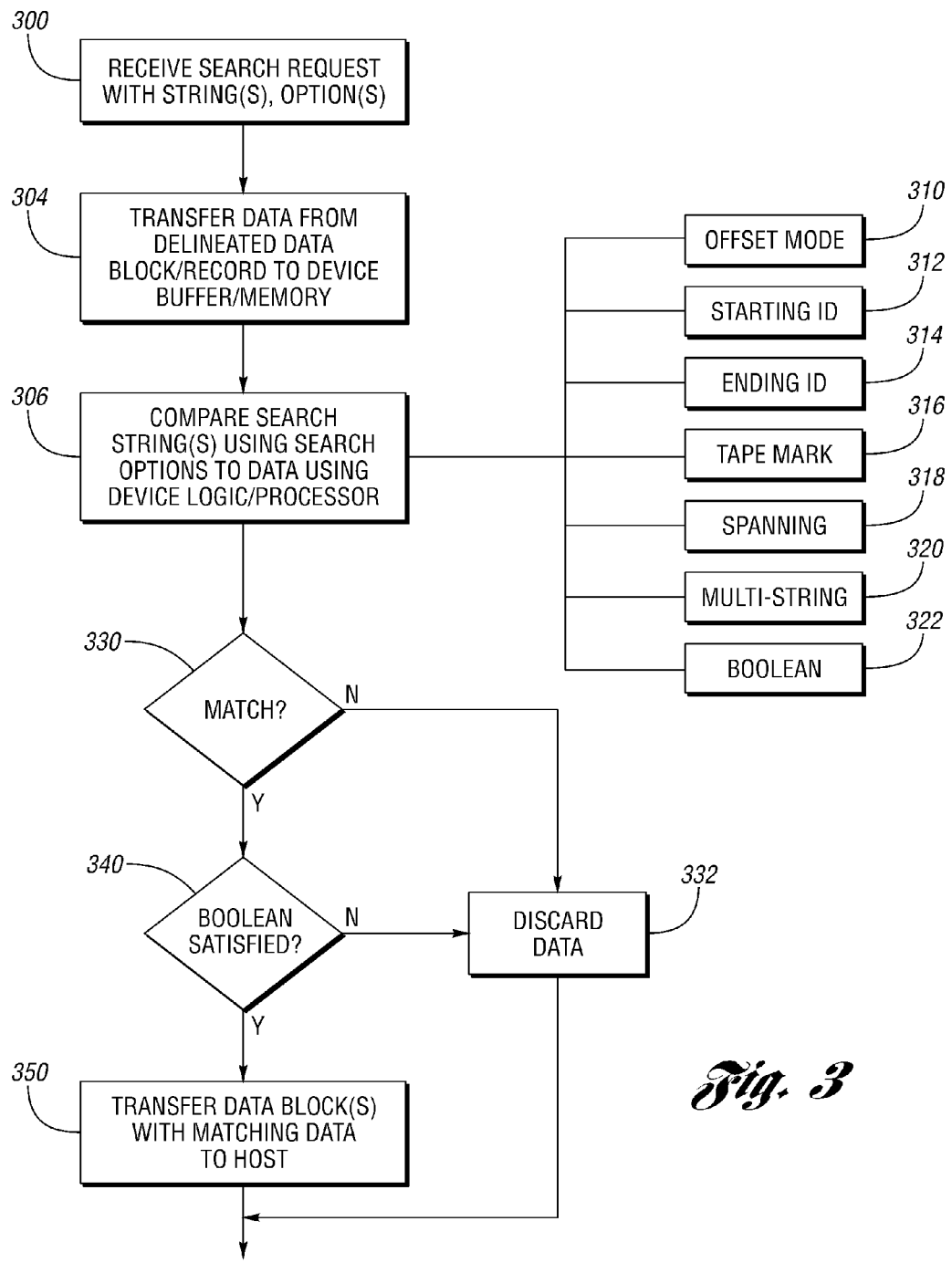
FIG. 3 is a simplified block diagram or flowchart illustrating operation of a peripheral string search system or method according to one embodiment of the present disclosure.

FIG. 3 is a flow chart illustrating operation of one embodiment of a system or method for string searching using peripheral storage device resources according to the present disclosure. As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. Various functions known to those of skill in the art may not be explicitly illustrated or described, but are implied by the illustrated blocks or modules. In one embodiment, the functions illustrated are primarily performed by control logic implemented by software, instructions, or code stored in a computer readable storage medium and executed by a microprocessor-based controller to control operation of the system. While generally illustrated and described with respect to a magnetic tape drive, those of ordinary skill in the art will recognize that various functions are applicable to various other types of peripheral storage devices, such as hard disks drives, optical drives, solid-state drives, and the like.

As generally illustrated in FIG. 3, a search request having at least one search string and one or more search options or parameters is communicated from a host device or computer and is received by a peripheral storage device as represented at block 300. Representative search options including support for multiple search strings and Boolean operators as described herein may vary by application or implementation Likewise, the size or length of the search string(s) may vary by application. In one embodiment, search strings of up to 1024 (1 kilobyte) are supported. The peripheral device controller reads each data block or host logic unit (HLU) separated by an associated data delineator stored on the storage media and transfers the associated data to the peripheral device memory or buffer(s) as represented by block 304. The search string(s) are then compared to the data using the peripheral device resources without transferring the data to the host device as represented by block 306. The comparison may function differently depending on the requested and/or support search options with representative options indicated generally by blocks 310-322.

For example, if the offset mode 310 parameter has a first designated value, such as zero, then the entire data block or HLU is searched for a match to the search string(s) starting with the first byte. If a match is found anywhere in the HLU (or record in this example), the corresponding record ID may be used to transfer the associated record data to the host device or computer. If the offset is greater than zero, then the byte-wise comparison begins at the given offset from the data delineator. If the string matches at the offset, then the record is transferred to the host device. If a match is found anywhere else in the record, the record is ignored and the data is discarded from the peripheral device memory/buffers. The search may then continue with the next HLU at the same offset from the beginning of the HLU as indicated by the data delineator. The search may end when a designated number of HLUs have been searched, when a designated ending HLU ID has been reached, or when a tape mark has been reached, for example, depending on the various other search options and/or the implementation of the offset mode option. In one embodiment, the tape may be repositioned to the beginning of the HLU, or may be advanced to the next HLU, in response to a match being identified.

Search options may also be used to designate a starting ID and/or ending ID as represented by blocks 312, 314, respectively. In one embodiment, if the starting ID 312 parameter value is zero, the search starts with the first record (or other HLU) on the data media. If the starting ID parameter value is greater than zero, the search starts with the record or HLU corresponding to the designated starting ID. Similarly, if the ending ID 314 parameter value is zero, the search continues until the end of the data media is reached. If the ending ID 314 parameter value is greater than zero, the search stops at the record or HLU corresponding to the designated ending ID. In one embodiment, search options may include a number of records or other HLUs to search and the search will continue until the designated number of records have been searched. Similarly, a tape mark option 316 may be used to designate the end of a search. a tape mark is a type of data block or delineator recorded on the tape and may be used to mark file sets between each directory, for example. Other more sophisticated strategies or tape labeling schemes may be used with different type of data delineators used to delineate data sets, file sets, recording sessions, etc. as previously described. In one embodiment, if the tape mark option 316 is set, the search ends when a tape mark is reached. When tape mark option 316 is not set, any tape marks are ignored and the search is controlled based on other designated search options.

The spanning option 318, when set, causes the peripheral storage device control logic to search for strings that span logically adjacent data blocks or HLUs as previously described. If a match is found that spans across two records, then one or both records are transferred to the host computer depending on the particular implementation. If the spanning option 318 is not set then matches that span across a data delineator are ignored or not identified as matches and only data within a single data block matching the search string(s) is identified as a match.

The multi-string option represented by block 320 allows multiple searches to occur in parallel and facilitates more advanced searches when used in conjunction with one or more Boolean operators as represented by block 322. Boolean mode 322 is valid only when in multi-string mode. The Boolean mode option allows for the selection of various Boolean operations, such as AND, OR, XOR, NOT, etc. relative to one or more search strings. Depending on the particular implementation, the Boolean mode 322 may accommodate more complex Boolean expressions such as "String-A AND String-B OR String-C" for example.

As also illustrated in FIG. 3, if no match is indicated based on the search string(s) and search options as represented by block 330, the data in the peripheral device memory/buffer is discarded as represented by block 332. However, if a single string is matched, the search of the current HLU and/or adjacent HLU may continue to determine whether the Boolean operator(s) or expression is satisfied as represented by block 340. If the Boolean operator/expression is not satisfied, the data is discarded as represented by block 332. Otherwise, the data block(s) containing data matching the search string(s) and otherwise satisfying the search options are transferred from the peripheral storage device to the host computer as represented by block 350. As previously described, if the spanning option is specified and a spanning match is identified, either or both of the adjacent data blocks may be transferred to the host computer depending on the particular implementation.

As the previously described representative embodiments illustrate, systems and methods for retrieving data stored on a peripheral storage device such as a magnetic tape drive or disk drive that use the peripheral storage device processor and transfer only data blocks with matching data to the associated host processor according to the present disclosure conserve host processor resources and data channel and/or network bandwidth. In addition, string searching using the peripheral device resources facilitates parallel simultaneous searches on multiple drives to improve search efficiency and performance. Various search option parameters may be used to further enhance search efficiency and perform more sophisticated searches using peripheral device resources and transferring only data records matching the specified search criteria to the host computer.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for retrieving data stored on a magnetic tape accessed by a tape drive having an associated tape drive processor in communication with a host computer having an associated host processor, the method comprising:
communicating a search request to the tape drive processor, the search request having at least one search string and at least one search option associated with identifying search strings that span a data delineator that separates adjacent data blocks stored on the magnetic tape;
reading data blocks separated by an associated data delineator stored on the magnetic tape;
comparing the at least one search string of the search request with data of the data blocks using the tape drive processor without transferring the data blocks to the host processor;
transferring each data block that contains data matching the at least one search string to the host processor; and
transferring adjacent data blocks to the host processor only when specified by the at least one search option in response to the at least one search string matching data that span the associated data delineator.

2. The method of claim 1 wherein the at least one search option specifies a search that spans a data delineator and wherein comparing comprises:
comparing the at least one search string with a first data block to determine a partial match; and
if a partial match is found, comparing an unmatched portion of the at least one search string with an adjacent data block to determine whether the at least one search string matches data that span the associated data delineator.

3. The method of claim 1 wherein the at least one search option specifies a starting data block and wherein the tape drive processor searches for the at least one search string beginning with the starting data block.

4. The method of claim 3 wherein the at least one search option specifies an ending data block and wherein the tape drive processor stops searching for the at least one search string at the ending data block.

5. The method of claim 4 wherein the ending data block parameter value designates the entire tape.

6. The method of claim 1 wherein the at least one search option specifies a number of data blocks to search and wherein the tape drive processor stops searching for the at least one search string after the designated number of data blocks have been searched.

7. The method of claim 1 wherein the at least one search string includes a plurality of search strings and the at least one search option includes at least one Boolean operator, the method further comprising:
comparing each of the plurality of search strings of the search request with data of a data block to determine matching search strings; and
evaluating the at least one Boolean operator relative to the matching search strings to determine whether the data block satisfies the at least one search string and at least one Boolean operator.

8. The method of claim 1 wherein the at least one search option specifies a byte offset and wherein the tape drive processor compares the at least one search string to data beginning at the specified byte offset within each data block.

9. The method of claim 1 wherein the at least one search option specifies a tape mark and wherein the tape drive processor stops searching for the at least one search string when the tape mark is encountered.

10. A system for retrieving data stored on a storage device in communication with a host device, the system comprising:
a storage device processor in communication with a data storage medium for storing data in data blocks separated by a data delineator, the storage device processor receiving a search request from the host device having at least one search string and at least one search option;
a buffer associated with the storage device processor that temporarily stores data retrieved from the storage medium;
control logic that transfers data from at least one data block to the buffer, compares data from the at least one data block with the at least one search string, and sends a message to the device if the comparison indicates a match; and
control logic that transfers only data blocks containing data matching the at least one search string from the storage device to the host device;
wherein the search request includes at least one search option that designates a search for at least one string spanning data delineators, the system further comprising control logic that compares the at least one search string to data spanning adjacent data blocks as stored on the storage medium.

11. The system of claim 10 wherein the control logic transfers adjacent data blocks to the host processor when the at least one search string matches data spanning the adjacent data blocks.

12. The system of claim 11 wherein the control logic compares the at least one search string with data from a first data block to determine a partial match and if a partial match is determined, compares an unmatched portion of the at least one search string with data from an adjacent data block to determine whether the at least one search string matches data spanning the adjacent data blocks.

13. The system of claim 10 wherein the at least one search option designates a starting and ending data block and wherein the control logic compares the at least one search string to data stored in the designated data blocks.

14. The system of claim 10 wherein the at least one search string includes a plurality of search strings and the at least one search option includes at least one Boolean operator, the system further comprising control logic that evaluates the at least one Boolean operator to determine if data stored in at least one data block matches the plurality of search strings and satisfies the at least one Boolean operator.

15. The system of claim 10 wherein adjacent data blocks are logically adjacent but stored in physically non-adjacent locations on the storage medium.

16. A method for retrieving data stored in a plurality of records on a computer-readable storage medium having an associated drive memory and a drive processor in communication with a host computer having an associated host processor, the method comprising:
communicating a search request having at least one search string and at least one search option to the drive processor;
transferring records from the computer-readable storage medium to the drive memory;
comparing the at least one search string with data in the drive memory using the drive processor; and
transferring only those records containing data matching the at least one search string to the host computer;
wherein the at least one search option designates a spanning search and wherein comparing includes comparing the at least one search string with data spanning adjacent records to determine a match, the method further comprising transferring the adjacent records to the host computer that contain data spanning the adjacent records that matches the at least one search string.

17. The method of claim 16 wherein the at least one search string includes a plurality of search strings and the at least one search option includes at least one Boolean operator, the method further comprising evaluating matching search strings using the at least one Boolean operator and transferring only those records containing data matching the at least one search string and satisfying the at least one Boolean operator to the host computer.

18. The method of claim 16 wherein the computer readable storage medium comprises a magnetic tape having at least one tape mark delineating groups of records, the method further comprising stopping the transferring of records from the computer readable storage medium when the tape mark is detected only if specified by the at least one search parameter.

* * * * *